(12) United States Patent
Teshima

(10) Patent No.: US 6,188,824 B1
(45) Date of Patent: Feb. 13, 2001

(54) OPTICAL SIGNAL TRANSMISSION MULTICORE PLASTIC OPTICAL FIBER

(75) Inventor: Shinichi Teshima, Yokohama (JP)

(73) Assignee: Asahi Kasei Kogyo Kabushiki Kaisha, Osaka (JP)

(*) Notice: Under 35 U.S.C. 154(b), the term of this patent shall be extended for 0 days.

(21) Appl. No.: 09/331,884

(22) PCT Filed: Feb. 5, 1998

(86) PCT No.: PCT/JP98/00475

§ 371 Date: Jun. 29, 1999

§ 102(e) Date: Jun. 29, 1999

(87) PCT Pub. No.: WO98/35247

PCT Pub. Date: Aug. 13, 1998

(30) Foreign Application Priority Data

Feb. 7, 1997 (JP) .................................................. 9-024839

(51) Int. Cl.[7] .................................................. G02B 6/02
(52) U.S. Cl. .................. 385/126; 385/123; 385/124; 385/143; 385/145
(58) Field of Search ............................ 385/126, 123–127, 385/141–145; 427/163.2; 264/1.24; 250/227.14; 478/392; 522/35, 99; 525/200; 526/247

(56) References Cited

U.S. PATENT DOCUMENTS

| 5,471,553 | * | 11/1995 | Teshima ................. 385/125 |
| 5,734,773 | * | 3/1998 | Teshima et al. .......... 385/126 |
| 5,742,722 | * | 4/1998 | Imoto ..................... 385/126 |

FOREIGN PATENT DOCUMENTS

| 62-075603 | 4/1987 | (JP) . |
| 5-345632 | 12/1993 | (JP) . |
| 9532442 | 11/1995 | (WO) . |

* cited by examiner

Primary Examiner—Phan T. H. Palmer
(74) Attorney, Agent, or Firm—Birch, Stewart, Kolasch & Birch, LLP.

(57) ABSTRACT

The present invention relates to a multicore plastic optical fiber for optical signal transmission, which comprises a plurality of cores made of a transparent resin; first cladding layers made of a transparent first cladding resin having a lower refractive index than said core resin, each of said first cladding layers coating said each core; and a second cladding resin surrounding said cores with said first cladding layers, and having a lower refractive index than said first cladding resin. The multicore plastic optical fiber of the present invention is suitably applicable to optical signal transmission since it receives a large quantity of light and exhibits a small light loss upon bending.

4 Claims, 2 Drawing Sheets

OPTICAL SIGNAL TRANSMISSION MULTICORE PLASTIC OPTICAL FIBER

This application is the national phase under 35 U.S.C § 371 of PCT International Application No. PCT/JP98/00475 which has an International filing date of Feb. 5, 1998 which designated the United States of America.

TECHNICAL FIELD

The present invention relates to an optical fiber. More particularly, it concerns a plastic optical fiber used as an optical signal transmission medium which is arranged around equipment such as personal computers, audio visual equipment, switchboards, telephones, office automation equipment and factory automation equipment.

BACKGROUND OF THE INVENTION

As disclosed in PCT International Patent Publication No. WO95/32442, there have been conventionally employed, as multicore plastic optical fibers for communication, a bare multicore plastic optical fiber comprising a plurality of cores of a transparent core resin having a high refractive index and a cladding arranged so as to surround and bundle the cores, a bare multicore plastic optical fiber prepared by coating each core fiber with a cladding resin to form a cladding layer and surrounding the cladded core fibers with a third resin to bundle them, and a multicore plastic optical fiber cable formed by coating the bare multicore optical fibers with a sheathing resin.

Single core plastic optical fibers formed by coating a core with a cladding resin in two layers are disclosed in Japanese Patent Application Laid-Open Nos. 204209/1987, 51206/1992 and 249325/1993. However, the fibers disclosed therein are single core plastic optical fibers, not multicore plastic optical fibers. Therefore, they have a large core diameter and insufficient light retention upon bending. In case of the conventional multicore plastic optical fibers, when the numerical aperture of the fibers (hereinafter referred to as Fiber NA) is decreased in order to widen signal transmission band width, and when the numerical aperture of incident light source (hereinafter referred to as LNA) is larger than Fiber NA, the fibers cannot receive a light beyond the Fiber NA. Accordingly, the conventional multicore plastic optical fibers have a drawback that the light requirement is small. Another drawback of the conventional multicore plastic optical fibers is light loss caused by bending the fibers. Usually, a multicore plastic optical fiber can reduce light loss caused by bending since each core diameter of the multicore plastic optical fiber can be made very small. Nevertheless, when Fiber NA becomes small, the light loss upon bending unpreferably becomes too large to ignore. Even in the case that Fiber NA is relatively large, a plastic optical fiber having smaller light loss upon bending is more preferable.

An object of the present invention is to provide such a plastic optical fiber with desirable transmission bandwidth that receives a larger quantity of light from a light source and causes less light loss upon bending the fiber.

DISCLOSURE OF THE INVENTION

The present invention relates to a multicore plastic optical fiber for signal transmission comprising 7 or more cores made of a transparent core resin, first cladding layers made of a transparent first cladding resin having a lower refractive index than said core resin, each of said first cladding layers coating said each core, and a second cladding resin surrounding said cores with said first cladding layers, and having a lower refractive index than said first cladding resin, wherein said multicore plastic optical fiber is manufactured by a composite spinning method.

The present invention further relates to a multicore plastic optical fiber, wherein said cores are coated with said first cladding layers to form islands, and said second cladding resin fuses to form a sea.

The present invention further relates to a multicore plastic optical fiber, wherein each of said cores coated with said first cladding layers is further coated with a layer of said second cladding resin to form islands, and a fourth resin surrounds said islands and fuses to form a sea.

The present invention yet further relates to a multicore plastic optical fiber which has the relation represented by the following equations:

Fiber NA$\leq$0.45; and $n_{CLAD1} - n_{CLAD2} \geq 0.02$ wherein Fiber NA represents a numerical aperture of the multicore plastic optical fiber and is defined by the equation, Fiber NA=$(n_{CORE}^2 - n_{CLAD1}^2)^{0.5}$; and $n_{CORE}$, $n_{CLAD1}$ and $n_{CLAD2}$ represent refractive indexes of said core resin, said first cladding resin, and said second cladding resin measured at 20° C. using sodium D-line, respectively.

Namely, the difference between the multicore plastic optical fiber of the present invention and the conventional multicore plastic optical fiber is that the multicore optical fiber of the present invention employs two kinds of cladding resins whose refractive indexes differ stepwise. The first cladding directly surrounds cores, and it must have a refractive index corresponding to the band width of the optical fiber. In other words, the band width depends on Fiber NA defined by the square root of difference between the square of the refractive index of the core and the square of that of the cladding. Therefore, the smaller Fiber NA is, the larger the band width is. Although the effect in coating the cores with the first cladding resin surrounded by the second cladding resin is rather complicated, it may be explained as follows. If the cladding resins employed for a plastic optical fiber comprising a core, a first cladding and a second cladding are selected so as to satisfy the following relationship, a refractive index of cores>a refractive index of a first cladding resin>a refractive index of a second cladding resin, an incident light on such an optical fiber is at first transmitted therein at a relatively large angle to the fiber axis as if it proceeds in an optical fiber comprising a core and a second cladding. As the light further travels through the fiber (the fiber lengthens), it changes to a light at a smaller angle to the fiber axis as if the optical fiber comprises a core and a first cladding. Namely, an incident light on the cores at a relatively large angle penetrates the first cladding layer and travels through the optical fiber with full reflection at the boundary between the first and second cladding layers. However, since the light transparency of the first cladding layer is not as high as that of the core resin, the light traveling through the first cladding layer is absorbed and vanished, or is converted to a useful light, which fully reflects at the first cladding layer because of some change in reflecting angles, while the full reflection of the light at the boundary of the first and second claddings is repeated. The multicore plastic optical fiber of the present invention is thought to be such a fiber that changes an incident light thereto at a large angle to one within the predetermined Fiber NA as if it comprises a core and a first cladding while the light travels through a 5 meter long fiber. In this sense, an optical fiber having a single cladding is regarded as the optical fiber having a constant Fiber NA; contrary, a fiber having first and second claddings can be the optical fiber whose Fiber NA becomes smaller in the long direction of the fiber.

The optical fiber of the present invention is structured by coating each of 7 or more cores with a first cladding resin and further surrounding each of the cladded cores with a second cladding resin so as to bundle them and form a fiber. As shown in FIG. 1, the optical fiber of the present invention is a multicore plastic optical fiber comprising "islands" formed by coating each core with the first cladding resin layer and a "sea" of the second cladding resin layer surrounding the islands so as to bundle them. Further, for a special occasion, a fourth resin can be employed, for example, in order to improve the heat or chemical resistance of the fiber, and to impart optical shielding to each core. As shown in FIG. 2, the optical fiber of the present invention is a multicore plastic optical fiber comprising "islands" formed by coating each core with the first cladding resin layer and further coating each of them with the second cladding resin layer, and a "sea" of a fourth resin surrounding the islands so as to bundle them.

Hereinafter, preferable ranges of a core number, a core diameter, a bare fiber diameter of the present multicore plastic optical fiber are described. A preferable core number is at least 7 since the cores can be arranged in a circle. The maximum number of cores is not particularly limited, but it is about 10,000 in view of the easiness of fiber manufacturing. More preferable number of cores is 19 to 1,000. The core diameter is preferably about 5 to 500 μm, more preferably 20 to 250 μm, most preferably 50 to 200 μm. As the fiber diameter becomes smaller, the optical fiber decreases in the light loss, but the transmission loss increases. Accordingly, it is preferable to coat the cores of a fiber with two cladding layers so as to make the light loss by bending relatively small and to make the core diameter large for reducing a transmission loss of the plastic optical fiber.

Ratios of the total cross-sectional area of the cores, the total cross-sectional area of the first cladding layers and the total cross-sectional area of the second cladding layers or fourth resin to the cross-sectional area of the bare multicore plastic optical fiber are as follows. The ratio of the total cross-sectional area of the cores is preferably about 60 to 90%, more preferably 70 to 85%. The core ratio of less than 60% reduces a light quantity. That of more than 90% increases a transmission loss since the circular arrangement of cores is deformed. The ratio of the total cross-sectional area of the first cladding layer is preferably 3 to 30%, more preferably 5 to 15%, because the first cladding layer performs as an optical transmission layer in addition to a reflective layer so that a first cladding layer that is too thick increases optical absorption loss. From this viewpoint, it is preferable that the first cladding layer is thinly arranged around a core in almost a ring shape with a thickness of about 0.8 to 3 μm. The ratio of the total cross-sectional area of the second cladding layer is preferably 3 to 30%, more preferably 7 to 20%. The thickness of the second cladding layer is preferably 1 to 20 μm. Further, in case of the structure employing a fourth resin layer, the ratio of the total cross-sectional area of the fourth resin layer is preferably 3 to 30%, more preferably 7 to 20%. The thickness of the fourth resin layer is preferably 1 to 20 μm.

The bare multicore plastic optical fiber of the present invention comprising cores, first cladding layers and second cladding layers, and optionally a fourth resin layer, preferably has a diameter of 0.1 to 3 mm. When the diameter is less than 0.1 mm, the bare fiber is too thin so that the handling thereof becomes difficult. Contrary, when it is more than 3 mm, the bare fiber is too rigid so that the handling thereof becomes difficult. More preferable fiber diameter is 0.5 to 1.5 mm.

Next, the core resin and the first and second cladding resins to be used for the multicore plastic optical fiber of the present invention are described.

Various transparent resins can be used as a core resin for the multicore plastic optical fiber of the present invention. The well-known polymethylmethacrylate type resins are used as a particularly preferable resin. Such polymethylmethacrylate resins include a methylmethacrylate homopolymer and a copolymer containing 50% by weight or more of methylmethacrylate. Copolymerizable components include acrylic acid esters such as methyl acrylate, ethyl acrylate and butyl acrylate; methacrylic acid esters such as ethyl methacrylate, propyl methacrylate and cyclohexyl methacrylate; maleimides such as isopropyl maleimide; acrylic acid; methacrylic acid; styrene; and the like. From these components, one or more components are appropriately selected for copolymerization. In addition, styrene type resins can be preferably employed. For example, a styrene homopolymer, a copolymer of styrene and methylmethacrylate and the like are exemplified. Further, polycarbonate type resins can be also preferably used. The polycarbonate type resins are characterized in high heat resistance and low moisture absorption. Moreover, CYTOP® resin manufactured by Asahi Glass Co., Ltd., TEFLON AF® resin manufactured by Du Pont, ARTON® resin manufactured by JSR Co., Ltd. and the like, which have been proposed as core resins for plastic optical fibers, are applicable to core resins.

The relation between the core and the first cladding resin is described below. First of all, the refractive index is described. When the refractive indexes of the core resin, the first cladding resin and the second cladding resin, which are defined as $n_{CORE}$, $n_{CLAD1}$, $n_{CLAD2}$, respectively, are measured at 20° C. using sodium D-line, the numerical aperture of the multicore plastic optical fiber, Fiber NA, is represented by an equation as follows:

$$\text{Fiber NA} = (n_{CORE}^2 - n_{CLAD1}^2)^{0.5}$$

In the present invention, target Fiber NA is about 0.1 to 0.6. The smaller Fiber NA is, and the larger the difference of the refractive indexes between the first and second cladding resins is, the more the effect of the present invention is improved. Such a tendency is particularly pronounced by a multicore plastic optical fiber with Fiber NA of 0.45 or less and $n_{CLAD1} - n_{CLAD2} \geq 0.02$. In case of a conventional optical fiber with a single cladding, low Fiber NA like 0.45 reduces a light quantity received from the light source and increases light loss upon bending though a high speed transmission is achieved. However, the optical fiber with the two cladding structure of the present invention can exhibit surprisingly marked effects.

As the first cladding resin, there can be specifically exemplified resins containing fluoroalkyl methacrylate, vinylidene fluoride type resins, alloys prepared by mixing a vinylidene fluoride type resin with a methacrylate type resin and the like in case the core resin is MMA type resins. Particularly for transmission use, a fluoroalkyl methacrylate resin is preferable since it does not have crystalline properties and does not change in the loss at a high temperature. As fluoroalkyl methacrylate, the component represented by the following formula is exemplified.

wherein n=1, 2; m is an integer of 1 to 11; and X=H, F

There can be exemplified copolymers comprising at least one of the fluoroalkyl methacrylate monomers represented by the above formula and other copolymerizable components such as fluoroalkyl methacrylates, alkyl methacrylates and alkylacrylates. More specifically, fluoroalkyl methacrylates include trifluoroethyl methacrylate, tetrafluoropropyl methacrylate, pentafluoropropyl methacrylate, heptadecafluorodecyl methacrylate and octafluoropropentyl methacrylate, and fluorinated acrylate monomers include trifluoroethyl acrylate, tetrafluoropropyl acrylate; and octafluoropentyl acrylate. In addition to these fluorine type monomers, as components with high refractive index, there can be exemplified copolymers comprising various combinations of methacrylate monomers such as methylmethacrylate and ethylmethacrylate, acrylate monomers such as methylacrylate, ethylacrylate and butylacrylate, methacrylic acids and acrylic acids. The vinylidene fluoride type resins include a copolymer comprising vinylidene fluoride and hexafluoroacetone, a copolymer comprising vinylidene fluoride, hexafluoroacetone and trifluoroethylene or tetrafluoride, a copolymer comprising vinylidene fluoride and hexafluoropropene, a copolymer comprising vinylidene fluoride, hexafluoropropene and trifluoroethylene or tetrafluoride, and a copolymer of vinylidene fluoride and tetrafluoroethylene, particularly preferably a copolymer comprising 80% mole of vinylidene fluoride and 20% mole of tetrafluoroethylene. In addition, a copolymer of vinylidene fluoride and trifluoroethylene and the like are also exemplified. Moreover, alloys prepared by mixing vinylidene fluoride type resins and methacrylate type resins may be preferably used. The methacrylate type resins include a methylmethacrylate homopolymer, an ethylmethacrylate homopolymer and copolymers containing these homopolymers as a main component. Methylmethacrylates, alkyl acrylates such as butylacrylate, alkyl methacrylates and the like may be compolymerized with the above-exemplified methacrylate type resins. Further, in case of Fiber NA of 0.25 or less, the cladding resin may be a resin composition without fluorine components such as a copolymer of methylmethacrylate and butylacrylate. For the purpose of controlling Fiber NA, the refractive index of the first cladding resin is selected. The first cladding must perform not only as a light reflective layer but also as an optical transmitting layer to some extent. Therefore, it is preferable that the first cladding has higher transparency. For this reason, a fluoroalkyl methacrylate type cladding and a mixture of a vinylidene fluoride type resin and a methacrylate type resin, which have high transparency, are more preferred. The second cladding resin must have lower refractive index than the first cladding resin. The lower the refractive index of the second cladding resin is, the more appropriate to the present invention such a resin is. As well as the first cladding resin, the resins having low refractive index such as a fluoroalkyl methacrylate type resin, a vinylidene fluoride type resin, TEFLON AF® manufactured by Du Pont and CYTOP® manufactured by Asahi Glass Co., Ltd. are preferable as the second cladding resin. A vinylidene fluoride type resin is more preferable. This is because the vinylidene fluoride type resin possesses flexibility and mechanical strength. Further, when the first cladding resin is a fluoroalkyl methacrylate type resin or a mixture of a vinylidene fluoride type resin and a methacrylate type resin, the second cladding resin of the vinylidene fluoride type adheres well to the first cladding layer to form a multicore plastic optical fiber with high mechanical strength. The vinylidene fluoride type resin includes a copolymer of vinylidene fluoride and tetrafluoroethylene, a copolymer of vinylidene fluoride and hexafluoropropene, a copolymer of vinylidene fluoride and hexafluoroacetone, a copolymer of vinylidene fluoride and trifluoroethylene, a copolymer of vinylidene fluoride, trifluoroethylene and hexafluoroacetone, a copolymer of vinylidene fluoride, tetrafluoroethylene and hexafluoroacetone, a copolymer of vinylidene fluoride, trifluoroethylene and hexafluoroacetone, a copolymer of vinylidene fluoride, tetrafluoroethylene and hexafluoropropene and the like.

In case of the multicore optical fiber as shown in FIG. 2, the fourth resin includes a vinylidene fluoride type resin, a nylon 12 resin, a polycarbonate resin, a PMMA resin and the like. When the vinylidene fluoride type resin is employed, it is possible in the present invention to employ a resin having lower refractive index than the second cladding resin and form a multicore plastic optical fiber with a three layered cladding.

The multicore plastic optical fiber of the present invention is manufactured by the composite spinning method wherein a core resin, a first cladding resin and a second cladding resin are all melt molded at the same time. This reason is that when the multicore plastic optical fiber is applied to communication use, it is very important that the relative position of each core is kept even at any cross-sections of the fiber, that the cores are arranged at a high density, i.e., without gaps, and that the transmission loss of each core is reduced to as low as possible. The reason why the relative position of each core is important is that the connection efficiency of light is very effectively enhanced when the center of a light emitting component corresponds to the cores in the center part of a multicore plastic optical fiber and it further corresponds to the center of the photodetector at the other end of the fiber. Therefore, the multicore plastic optical fiber of the present invention is totally different from one formed by bundling single core plastic optical fibers.

Examples of the structure of a composite spinning die to be used for the composite spinning method are shown in FIGS. 3 and 4. FIG. 3 shows a composite spinning die for manufacturing a multicore plastic optical fiber with the structure shown in FIG. 1, wherein a core resin, a first cladding resin and a second cladding resin, all of which are molten, are simultaneously introduced in the die to form a multicore structure. FIG. 4 shows a composite spinning die for manufacturing a multicore plastic optical fiber with the structure shown in FIG. 2, wherein a core resin, a first cladding resin, a second cladding resin and a fourth resin, all of which are molten, are simultaneously introduced in the die to form multicore structured strands. These multicore structured strands are drawn so as to be about 1.2 to 3 times and are subjected to heat treatment to obtain a bare multicore plastic optical fiber having a desired diameter.

In general, the bare multicore plastic optical fiber of the present invention manufactured as described above is used in the form of a cable by covering it with polyethylene, a copolymer of ethylene and vinyl alcohol, a copolymer of ethylene and vinyl acetate, polypropylene, polyvinyl chloride, a polyurethane resin, a polyamide resin, a polyester resin, a vinylidene fluoride type resin, a silicone resin, a crosslinked polyolefin resin, crosslinked polyvinyl chloride resin and the like.

Since the plastic optical fiber of the present invention comprises a plural number of cores which are completely unified and the relative position of each core is strictly maintained, it shows high connection efficiency of light source and photodetectors for communication use and, therefore, it can be advantageously connected with other optical fibers having a smaller diameter. The end of the optical fiber of the present invention can be easily fixed to connectors by caulking with a coating material, adhesive agents and the like as well as handling of a single core plastic optical fiber with a larger diameter.

Such a multicore plastic optical fiber can be used as a signal transmission medium for optical communication. Equipment employing the multicore plastic optical fiber of the present invention includes personal computers, audio visual equipment, switchboards, telephones, office automation equipment, factory automation equipment and the like, which are connected with optical data links. In case of LAN of a personal computer which is set on a desk, the multicore plastic optical fiber of the present invention can be advantageously applied to the interface cable since the interface cable connected to the LAN card is required to have high flexibility. In addition, the multicore plastic optical fiber of the present invention can be applied to various uses such as portable audio visual equipment and factory automation equipment.

Figure 1:
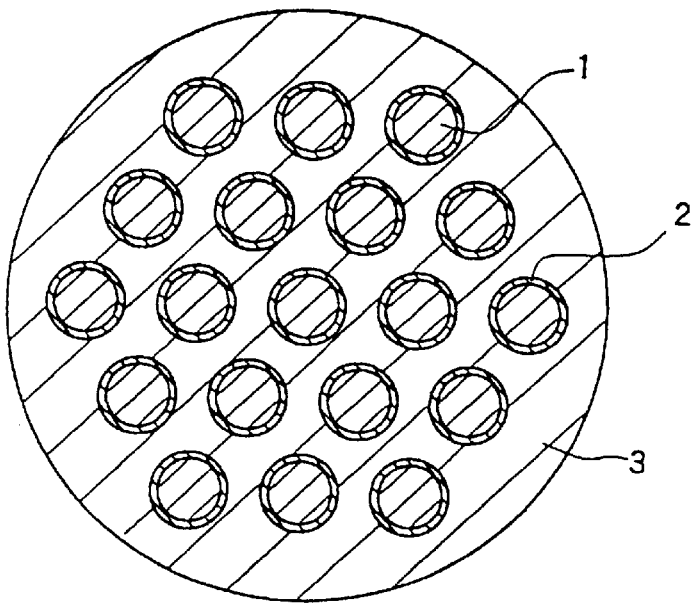
FIG. 1 is a schematic cross-sectional view of the multicore plastic optical fiber of the present invention, i.e., a multicore plastic optical fiber for optical signal transmission comprising islands formed by coating cores independently with a first cladding layer and a sea of a second cladding layer.
Figure 2:
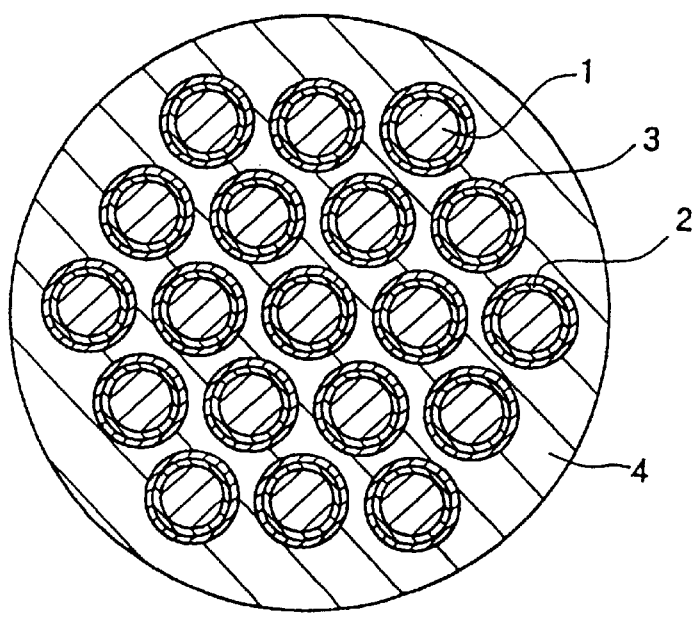
FIG. 2 is a schematic cross-sectional view of the multicore plastic optical fiber of the present invention, i.e., a multicore plastic optical fiber for optical signal transmission comprising islands formed by coating cores independently with a first cladding layer and further coating them independently with a second cladding layer and a sea of a fourth resin.

The numerals used in the figures are as follows:
1: core
2: first cladding
3: second cladding
4: fourth resin (supporting part)
5: port for supplying core resin
6: port for supplying first cladding resin
7: port for supplying second cladding resin
8: core guide pipe
9: cladding guide pipe
10 port for supplying fourth resin
11: fourth resin guide pipe

BEST MODE FOR CARRYING OUT THE INVENTION

Hereinafter the present invention is described referring to Examples, but the scope thereof is not limited thereby.

EXAMPLE 1

Figure 3:
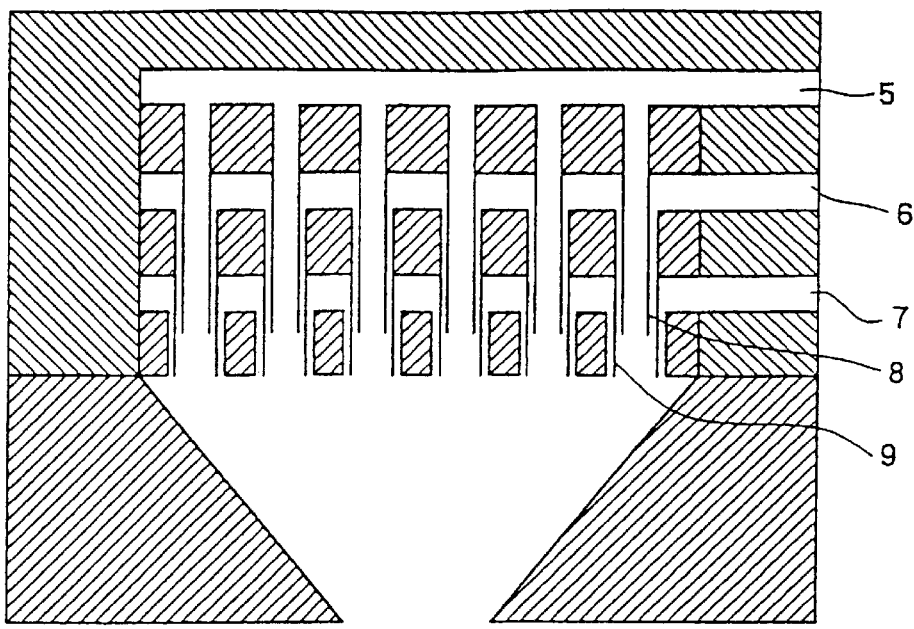
FIG. 3 is a schematic view of a composite spinning die for manufacturing the multicore plastic optical fiber of the present invention, i.e., a multicore plastic optical fiber for optical signal transmission comprising islands formed by coating cores independently with a first cladding layer and a sea of a second cladding layer.
Figure 4:
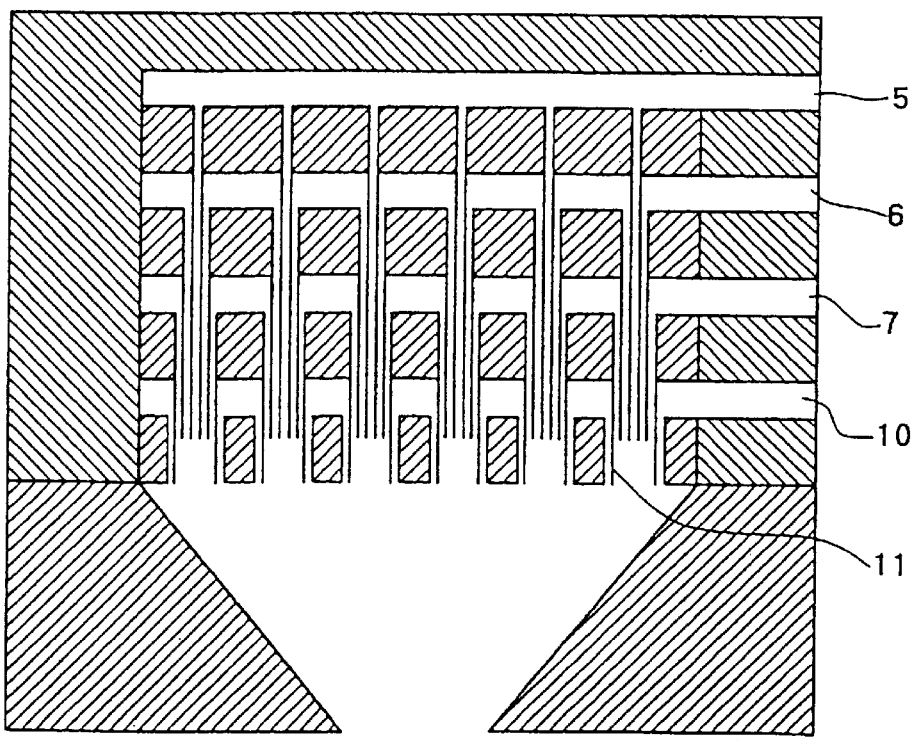
FIG. 4 is a schematic view of a composite spinning die for manufacturing the multicore plastic optical fiber of the present invention, i.e., a multicore plastic optical fiber for optical signal transmission comprising islands formed by coating cores independently with a first cladding layer and further coating them independently with a second cladding layer and a sea of a fourth resin.

As a core resin, a polymethacrylate resin having a refractive index $n_{CORE}$ of 1.492 and a melt flow index of 1.5 g/10 min under the conditions of 230° C., a load of 3.8 kg, an orifice diameter of 2 mm and a length of 8 mm was employed. As a first cladding, a composition with a melt flow index of 31 g/10 min at 230° C. under a load of 3.8 kg and a refractive index of 1.47, which was prepared by cast polymerizing 14% by weight of 17 FMA, 6% by weight of 4 FM, 6% by weight of 3 FMA and 74% by weight of MMA, was employed. As a second cladding, a copolymer containing 80 mol % of vinylidene fluoride and 20 mol % of tetrafluoroethylene, of which melt flow index measured under the same conditions as of the first cladding was 30 g/10 min and refractive index was 1.402, was employed. As a composite spinning die, a dice as shown in FIG. 3, which has 91 holes and is structured so as to cover each core with first and second claddings, was employed. In the composite spinning die, the core resin, first cladding resin and second cladding resin were fed so that the volume ratio thereof be 80/10/10. Strands extruded from the die were bundled and drawn to twice as long as the original to produce a double-cladding multicore plastic optical fiber having a diameter of 1.22 mm. The Fiber NA of the resultant fiber was 0.26. Further, the resultant bare fiber was covered with black polyethylene to produce a double-cladding multicore plastic optical fiber cable having a diameter of 2.2 mm. The transmission loss of this multicore plastic optical fiber cable was 182 dB/km when it was measured under the conditions of a wavelength of 650 nm and LNA of 0.15.

A monochromatic light with 650 nm wavelength was entered into the double-cladding multicore plastic optical fiber at various LNA to measure a quantity of the light transmitted through a 2 meter long fiber. With respect to the single-cladding multicore plastic optical fiber prepared in Comparative Example 1 described below, a transmitted light quantity was measured according to the same manner as the double-cladding plastic optical fiber. A transmitted light quantity magnification of the double-cladding multicore plastic optical fiber to the single-cladding multicore plastic optical fiber, i.e., a power multiple of the transmitted light through the double-cladding multicore plastic optical fiber comparing with the single-cladding multicore plastic optical fiber, is shown in Table 1.

Next, the double-cladding multicore plastic optical fiber cable was cut so as to be 2 meters long. Into the cut cable, a LED light with a wavelength of 650 nm and LNA of 0.6 or more was entered. The middle portion of the cable was wound once around a rod having a radius of 10 mm to measure the change in light quantity caused thereby. The result is shown in Table 2.

Comparative Example 1

For comparison, the first cladding resin was fed to the same composite spinning die as in Example 1 instead of the second cladding resin to produce a single-cladding multicore plastic optical fiber having 91 cores. The volume ratio of the cores to the first cladding was adjusted so as to be 80/20 and a single-cladding multicore plastic optical fiber having a diameter of 1.22 mm was produced. As well as Example 1, the multicore plastic optical fiber was coated with black polyethylene to produce a singe-cladding multicore plastic optical fiber cable having an outer diameter of 2.2 mm. The transmission loss of the multicore plastic optical fiber was 181 dB/km under the conditions of a wavelength of 650 nm and LNA of 0.15.

Next, the single-cladding multicore plastic optical fiber cable was cut so as to be 2 meters long. Into the cut cable, a LED light with a wavelength of 650 nm and LNA of 0.6 or more was entered. The middle portion of the cable was wound once around a rod having a radius of 10 mm to measure the change in light quantity caused thereby. The result is shown in Table 2.

EXAMPLE 2

As a core resin, a polymethacrylate resin having a refractive index $n_{CORE}$ of 1.492, a melt flow index of 1.5 g/10 min under the conditions of 230° C., a load of 3.8 kg, an orifice diameter of 2 mm and a length of 8 mm was employed. As a first cladding, a composition with a melt flow index at 230° C. under a load of 3.8 kg of 25 g/10 min and a refractive index of 1.47, which was prepared by cast polymerizing 14% by weight of 17 FMA, 6% by weight of 4 FM, 6% by weight of 3 FMA and 74% by weight of MMA, was employed. As a second cladding, a copolymer containing 80 mol % of vinylidene fluoride and 20 mol % of tetrafluoroethylene, of which melt flow index measured under the same conditions as of the first cladding was 30 g/10 min and refractive index was 1.402, was employed. As a composite spinning die, a dice as shown in FIG. 3, which has 37 holes and is structured so as to cover each core with first and second claddings, was employed. In the composite spinning die, the core resin, first cladding resin and second cladding resin were fed so that the volume ratio thereof be 80/10/10. Strands extruded from the die were bundled and drawn to twice as long as the original to produce a double-cladding multicore plastic optical fiber having a diameter of 1.00 mm. The fiber NA of the resultant fiber was 0.26. Further, the resultant bare fiber was covered with black polyethylene to produce a double-cladding multicore plastic optical fiber cable having a diameter of 2.2 mm. The transmission loss of this multicore plastic optical fiber cable was 140 dB/km when it was measured under the conditions of a wavelength of 650 nm and LNA of 0.15.

A monochromatic light with 650 nm wavelength was entered into the double-cladding multicore plastic optical fiber at various LNA to measure a quantity of the light transmitted through a 2 meter long fiber. With respect to the single-cladding multicore plastic optical fiber prepared in Comparative Example 2 described below, a transmitted light quantity was measured according to the same manner as the double-cladding multicore plastic optical fiber. A transmitted light quantity magnification of the double-cladding multi-core plastic optical fiber to the single-cladding multicore plastic optical fiber, i.e., a power multiple of the transmitted light through the double-cladding multicore plastic optical fiber comparing with the single-cladding multicore plastic optical fiber, is shown in Table 3.

Next, the double-cladding multicore plastic optical fiber cable was cut so as to be 2 meters long. Into the cut cable, a LED light ("photom 205" manufactured by Haktronics Co., Ltd.) with a wavelength of 650 nm and LNA of 0.6 or more was entered. The middle portion of the cable was wound once around a rod having a radius of 10 mm to measure the change in light quantity caused thereby. The result is shown in Table 2.

Further, a LED light ("photom 205" manufactured by Haktronics Co., Ltd.) with a wavelength of 650 nm and LNA of 0.6 or more was connected to the 2 meter and 50 meter long double-cladding multicore plastic optical fiber cables as a light source to measure a transmitted light quantity. The results are shown in Table 5.

As seen from Table 5, the multicore plastic optical fiber of the present invention has a large transmitted light quantity in case of either 2 meters long or 50 meters long.

Comparative Example 2

For comparison, the first cladding resin was fed to the same composite spinning die as in Example 1 instead of the second cladding resin to produce a single-cladding multicore plastic optical fiber having 37 cores. The volume ratio of the cores to the first cladding was adjusted so as to be 80/20 and a single-cladding multicore plastic optical fiber having a diameter of 1.22 mm was produced. As well as Example 2, the multicore plastic optical fiber was coated with black polyethylene to produce a single-cladding multicore plastic optical fiber cable having an outer diameter of 2.2 mm. The transmission loss of the multicore plastic optical fiber was 140 dB/km under the conditions of a wavelength of 650 nm and LNA of 0.15.

Next, the single-cladding multicore plastic optical fiber cable was cut so as to be 2 meters long. Into the cut cable, a LED light ("photom 205" manufactured by Haktronics Co., Ltd.) with a wavelength of 650 nm and LNA of 0.6 or more was entered. The middle portion of the cable was wound once around a rod having a radius of 10 mm to measure the change in light quantity caused thereby. The result is shown in Table 4.

Further, a LED light ("photom 205" manufactured by Haktronics Co., Ltd.) with a wavelength of 650 nm and LNA of 0.6 or more was connected to the 2 meter and 50 meter long double-cladding multicore plastic optical fiber cables as a light source to measure a transmitted light quantity. The results are shown in Table 5.

EXAMPLE 3

As a core resin, a polymethacrylate resin having a refractive index $n_{CORE}$ of 1.492, a melt flow index of 1.5 g/10 min under the conditions of 230° C., a load of 3.8 kg, an orifice diameter of 2 mm and length of 8 mm was employed. As a first cladding, a composition with a melt flow index of 35 g/10 min at 230° C. under a load of 3.8 kg and a refractive index of 1.428, which was prepared by cast polymerizing 45% by weight of 17 FMA, 20% by weight of 4 FM and 35% by weight of MMA, was employed. As a second cladding, a copolymer containing 80 mol % of vinylidene fluoride and 20 mol % of tetrafluoroethylene, of which melt flow index measured under the same conditions as of the first cladding was 30 g/10 min and refractive index was 1.402, was employed. As a composite spinning die, a dice as shown in FIG. 3, which has 37 holes and is structured so as to cover each core with first and second claddings, was employed. In the composite spinning die, the core resin, first cladding resin and second cladding resin were fed so that the ratio thereof be 80/10/10. Strands extruded from the die were bundled and drawn to twice as long as the original to produce a double-cladding multicore plastic optical fiber having a diameter of 1.00 mm. Further, the resultant bare fiber was covered with black polyethylene to produce a double-cladding multicore plastic optical fiber cable having a diameter of 2.2 mm. The Fiber NA of the resultant cable was 0.43. The transmission loss of this multicore plastic optical fiber cable was 135 dB/km when it was measured under the conditions of a wavelength of 650 nm and LNA of 0.15.

Next, the double-cladding multicore plastic optical fiber cable was cut so as to be 2 meters long. Into the cut cable, a LED light ("photom 205" manufactured by Haktronics Co., Ltd.) with a wavelength of 650 nm and LNA of 0.6 or more was entered. The middle portion of the cable was wound once around a rod having a radius of 10 mm to measure the change in light quantity caused thereby. The result is shown in Table 6.

Further, a LED light ("photom 205" manufactured by Haktronics Co., Ltd.) with a wavelength of 650 nm and LNA of 0.6 or more was connected to the 2 meter and 50 meter long double-cladding multicore plastic optical fiber cables as a light source to measure a transmitted light quantity. The results are shown in Table 7.

As seen from Table 5, the multicore plastic optical fiber of the present invention has a large transmitted light quantity in case of either 2 meters long and 50 meters long.

Comparative Example 3

For comparison, the first cladding resin was fed to the same composite spinning die as in Example 3 instead of the second cladding resin to produce a single-cladding multicore plastic optical fiber having 37 cores. The volume ratio of the cores to the first cladding was adjusted so as to be 80/20 and a single-cladding multicore plastic optical fiber having a diameter of 1.00 mm was produced. As well as Example 3, the multicore plastic optical fiber was coated with black polyethylene to produce a singe-cladding multicore plastic optical fiber cable having an outer diameter of 2.2 mm. The transmission loss of the multicore plastic optical fiber was 135 dB/km under the conditions of a wavelength of 650 nm and LNA of 0.15.

Next, the single-cladding multicore plastic optical fiber cable was cut so as to be 2 meters long. Into the cut cable, a LED light ("photom 205" manufactured by Haktronics Co., Ltd.) with a wavelength of 650 nm and LNA of 0.6 or more was entered. The middle portion of the cable was wound once around a rod having a radius different from that of Example 3 to measure the change in light quantity caused thereby. The result is shown in Table 6.

Further, a LED light ("photom 205" manufactured by Haktronics Co., Ltd.) with a wavelength of 650 nm and LNA of 0.6 or more was connected to the 2 meter and 50 meter long double-cladding multicore plastic optical fiber cables as a light source to measure a transmitted light quantity. The results are shown in Table 7.

TABLE 1

Ratio of transmitted light quantity of double-cladding multicore plastic optical fiber of the present invention to that of single-cladding multicore plastic optical fiber of Comparative Example 1 (Fiber length: 2 m; Monochromatic light with 650 nm)

| LNA | Ratio of transmitted light quantity of double-cladding multicore plastic optical fiber (Example 1) to that of single-cladding multicore plastic optical fiber (Comparative Example 1) |
|---|---|
| 0.05 | 1.0 |
| 0.15 | 1.05 |
| 0.20 | 1.1 |
| 0.25 | 1.2 |
| 0.30 | 1.5 |
| 0.40 | 2.0 |
| 0.50 | 2.5 |
| 0.60 | 2.5 |

TABLE 2

Light loss by bending

| | Double-cladding multicore plastic optical fiber (Example 1) | Single-cladding multicore plastic optical fiber (Comparative Example 1) |
|---|---|---|
| Loss by bending (Bending radius: 10 mm) | 0.05 dB | 0.4 dB |

TABLE 3

Ratio of transmitted light quantity of double-cladding multicore plastic optical fiber of the present invention to that of single-cladding multicore plastic optical fiber (Fiber length: 2 m; Monochromatic light with 650 nm)

| LNA | Ratio of transmitted light quantity of double-cladding multicore plastic optical fiber (Example 2) to that of single-cladding multicore plastic optical fiber (Comparative Example 2) |
|---|---|
| 0.15 | 1.0 |
| 0.20 | 1.0 |
| 0.25 | 1.3 |
| 0.30 | 1.6 |
| 0.40 | 2.6 |
| 0.50 | 2.9 |
| 0.60 | 2.9 |

TABLE 4

Light loss by bending

| Bending radius | Double-cladding multicore plastic optical fiber (Example 2) | Single-cladding multicore plastic optical fiber (Comparative Example 2) |
|---|---|---|
| 10 mm | 0.1 dB | 1.0 dB |
| 5 mm | 0.2 dB | 2.2 dB |
| 3 mm | 0.3 dB | 5.0 dB |

TABLE 5

Transmitted light quantities of double-cladding multicore plastic optical fiber of the present invention and single-cladding multicore plastic optical fiber (Light source: 650 nm LED)

| Length of optical fiber | Double-cladding multicore plastic optical fiber (Example 2) | Single-cladding multicore plastic optical fiber (Comparative Example 2) |
|---|---|---|
| 2 m | −16.9 dBm | −21.3 dBm |
| 50 m | −30.7 dBm | −33.9 dBm |

TABLE 6

Light loss by bending

| Bending radius | Double-cladding multicore plastic optical fiber (Example 3) | Single-cladding multicore plastic optical fiber (Comparative Example 3) |
|---|---|---|
| 10 mm | 0.1 dB | 0.3 dB |
| 5 mm | 0.2 dB | 1.1 dB |
| 3 mm | 0.4 dB | 1.8 dB |

TABLE 7

Transmitted light quantities of double-cladding multicore plastic optical fiber of the present invention and single-cladding multicore plastic optical fiber (Light source: 650 nm LED)

| Length of optical fiber | Double-cladding multicore plastic optical fiber (Example 3) | Single-cladding multicore plastic optical fiber (Comparative Example 3) |
|---|---|---|
| 2 m | −16.0 dBm | −17.2 dBm |
| 50 m | −28.6 dBm | −29.2 dBm |

What is claimed is:

1. A multicore plastic optical fiber for signal transmission comprising:

7 or more cores made of a transparent core resin; first cladding layers made of a transparent first cladding resin having a lower refractive light index than said core resin, each of said first cladding layers coating said each core; and a second cladding resin surrounding said cores with said first cladding layers, and having a lower refractive index than said first cladding resin.

2. The multicore plastic optical fiber according to claim 1, wherein said cores are coated with said first cladding layers to form islands, and said second cladding resin fuses to form a sea.

3. The multicore plastic optical fiber according to claim 1, wherein each of said cores coated with said first cladding layers is further coated with a layer of said second cladding resin to form islands, and a fourth resin surrounds said islands and fuses to form a sea.

4. The multicore plastic optical fiber according to claims 1 to 3, which has the relation represented by the following equations:

$$\text{Fiber NA} \leq 0.45; \text{ and}$$

$$n_{CLAD1} - n_{CLAD2} \geq 0.02$$

wherein Fiber NA represents a numerical aperture of the multicore plastic optical fiber and is defined by the equation, Fiber NA=$(n_{CORE}^2 - n_{CLAD1}^2)^{0.5}$; and $n_{CORE}$, $n_{CLAD1}$ and $n_{CLAD2}$ represent refractive indexes of said core resin, said first cladding resin, and said second cladding resin measured at 20° C. using sodium D-line, respectively.

* * * * *